United States Patent [19]

Minarczik et al.

[11] Patent Number: 5,790,631
[45] Date of Patent: Aug. 4, 1998

[54] WIRELESS DROP

[75] Inventors: Dennis A. Minarczik, Oakton; Daisy C. Copp, Herndon; Jay C. Lodsun, Vienna, all of Va.; Gerard J. Sasse, Philadelphia, Pa.; Harrison Wallace, Herndon, Va.; Robert D. Farris, Sterling, Va.; Richard G. Backus, Manassas, Va.

[73] Assignee: Bell Atlantic Network Services, Inc., Arlington, Va.

[21] Appl. No.: 559,668

[22] Filed: Nov. 20, 1995

[51] Int. Cl.$^6$ .............. H04M 1/24; H04M 3/08; H04M 3/22

[52] U.S. Cl. .............. 379/2; 379/1; 379/33; 379/39; 455/445

[58] Field of Search .............. 379/1–2, 15, 33–34, 379/58–59, 39–40; 455/403–466

[56] References Cited

U.S. PATENT DOCUMENTS

| | | |
|---|---|---|
| 4,658,096 | 4/1987 | West, Jr. et al. .............. 379/59 |
| 4,887,290 | 12/1989 | Dop et al. . |
| 4,993,059 | 2/1991 | Smith et al. . |
| 5,027,383 | 6/1991 | Sheffer . |
| 5,146,486 | 9/1992 | Lebowitz . |
| 5,185,779 | 2/1993 | Dop et al. . |
| 5,327,478 | 7/1994 | Lebowitz . |

*Primary Examiner*—Curtis A. Kuntz
*Assistant Examiner*—Duc Nguyen
*Attorney, Agent, or Firm*—McDermott, Will & Emery

[57] ABSTRACT

A wireless transceiver connects to a telephone line network terminal, in place of a disabled subscriber drop cable. A second wireless transceiver connects to customer premises wiring, typically at the network interface device and in place of the drop cable. The wireless transceivers preferably provide a cordless telephone type link. The second transceiver presents a standard telephone line appearance to the customer premises telephone wiring. Standard telephone station equipment, connected to the customer premises wiring in the normal manner, can make and receive telephone calls, as if still connected to a wire-line type telephone loop circuit.

23 Claims, 4 Drawing Sheets

FIGURE 1 CONVENTIONAL NETWORK CONFIGURATION

WIRELESS DROP

TECHNICAL FIELD

The present invention relates to methods and apparatus for temporarily replacing a cut or otherwise damaged subscriber loop drop cable in a telephone system with a wireless or cordless telephone link.

BACKGROUND ART

Telephone communication has become a virtually ubiquitous aspect of modern life, particularly in developed countries such as the United States. In such countries, subscribers have come to depend on the telephone network to provide fast, dependable communication whenever needed.

Particularly in residential settings, the customer premises wiring connects telephone station equipment to a central office switching system via a hardwired line. The line to the customer premises may take many different forms in the field, but most telephone circuit installations still utilize a twisted wire pair type loop or drop for at least the last 500 feet from some form of telephone line terminal into the customer premises. The drop cable may run along telephone poles and from an aerial terminal to a network interface device on the customer premises. Alternatively, the drop cable may run underground from a pedestal type terminal to the network interface device. The network interface device in turn connects the drop cable to the customer premises wiring. The customer premises equipment (CPE), e.g. telephone stations and the like, connects to the customer premises wiring.

The NID serves as the point of demarcation between the telephone company wiring and the customer premises wiring. The customer is responsible for maintaining and repairing the customer premises wiring, although some customers contract with the telephone company to service the customer premises wiring. The local telephone company is responsible for maintaining and repairing the telephone line from the central office as far as the NID on the customer premises.

Installations of the type described above generally are extremely dependable. However, even such installations are subject to occasional failures. For example, a loop or drop cable run from telephone poles as an aerial installation may deteriorate over time due to exposure to atmospheric conditions. As another example, persons unaware of the route of an underground drop cable who are digging up the property for some reason may inadvertently cut the buried cable.

Repair of damaged outside plant, particularly subscriber loop drop cables, is labor intensive and expensive. For either an aerial drop installation or an underground drop installation, the telephone company must dispatch a full work crew with appropriate equipment. To repair an aerial drop installation, for example, the crew must have a truck with a 'bucket' or 'cherry picker' type crane. To repair an underground drop installation, the crew needs equipment to dig up the damaged drop cable and then bury the new or repaired cable.

Typically, a local telephone company has only a limited number repair or installation technicians available and/or limited numbers of the required types of service trucks or other equipment. As a result, there will be times when the demand for the technicians' labor and/or certain types of outside plant repair equipment will result in work backlogs. At such times, it may take a week or more to repair a damaged drop cable.

For example, on weekends, a local telephone company typically has only one full repair crew on duty to service a large geographic area covering the residences of many telephone customers. In good weather, however, many homeowners perform a wide range of home maintenance and improvement activities. It is not uncommon to have several homeowners at widely dispersed locations excavating their respective properties at about the same time of day and cut their respective underground telephone line drop cables. At such a time, the repair crew is dispatched to repair the first reported cut cable, and the subscribers later reporting their damaged lines must wait.

Most telephone subscribers, who have come to expect ever-present ubiquitous telephone service, quickly become irate if the telephone company does not restore the interrupted telephone services quickly. Also, loss of telephone service prevents persons from reporting emergencies. In the above example, individual installation and repair technicians may be available on the weekend. Although one technician cannot fully repair the cut drop cable, sometimes such a technician may be able to effect some type of temporary repair, to put a subscriber back in service until the full crew and equipment are available. Such temporary repairs, however, often create new problems.

One such temporary repair involves providing a connection to a spare pair of wires running to a neighbor's premises. Typically the drop cable from the telephone line terminal (in the pedestal in this example) comprises an active twisted wire pair carrying a subscriber's telephone service signals and at least one spare pair. The technician can open the telephone line terminal housing (aerial terminal or pedestal housing) and connect the neighbor's spare pair in place of the cut line. The technician then connects a new cable to the spare pair in the neighbor's NID, runs the new cable across the ground to the subscriber's NID, and connects the new cable in that NID in place of the cut drop cable. The temporary line is exposed. Persons walking on either the subscriber's property or the neighbor's property may trip or entangle themselves in the exposed line cable. The exposed cable also is subject to damage, for example, a person mowing the grass may cut the temporary replacement cable.

As shown by the above example, the temporary repairs for cut or damaged drop cable that one technician can perform create additional problems and generally are not acceptable.

U.S. Pat. Nos. 4,887,290 and 5,185,779 to Dop et al. disclose an alarm system with a digital communicator that normally reports alarms via a dial-up connection over the subscriber's telephone line. The system includes a line-fault detector, a cellular interface and a cellular transceiver. In the event of a line fault, a relay switches the tip and ring connections for the digital communicator as well as the house telephones to the cellular interface. The digital communicator then reports alarms via a cellular telephone call through interface and transceiver. The relay latches the customer premises connections to the interface so that all communications go through the cellular link until there is a manual reset. Apparently, in this condition persons in the house can make telephone calls from telephones through the interface and the cellular transceiver. The Dop et al. system does not offer a solution to problems of cut or damaged cables in the vast majority of subscriber premises, i.e. those not requiring a complex alarm reporting system. The Dop et al. system requires a permanent installation of the interface and the cellular transceiver used for the wireless back-up. Also, the customer presumably must subscribe to cellular service as well as the normal telephone service. Such a permanent cellular installation and the attendant cellular subscription are quite expensive and are unwarranted unless the premises requires the alarm reporting capability. Also, to receive incoming calls, callers must know and use the customer's cellular number instead of the customer's normal telephone number.

In another approach, telephone campinesses have offered subscribers a guaranteed uninterrupted service. This service is particularly appealing to many elderly and infirm persons who rely on the guaranteed telephone service to permit them to report injuries or illness to people who can provide emergency assistance. With this guaranteed service, a telephone company will guarantee to repair any line faults within a specified short period of time and to supply the customer with temporary alternate telephone service, typically a cellular telephone, until the repair is completed. With such a service, the telephone company still must dispatch a full repair crew as discussed above. Also, the telephone company must arrange delivery of the alternate telephone.

The temporary alternate telephone solution, while effective for some customers, has drawbacks for other customers. Until the drop cable is restored, the customer's normal telephone equipment is inoperative, and the subscriber must use the alternate telephone (cellular telephone). Some customer premises equipment, such as normal telephone line connected answering machines, often cannot be easily converted to use with the alternate telephone. Also, some customers have difficulty operating the cellular telephone, but can easily operate their normal telephone equipment. For example, a portable cellular telephone typically has a small keypad, and a person with arthritis may have difficulty operating that keypad. Such persons however, usually have standard telephone equipment that they find easy and convenient to operate, but that equipment remains inoperative until the telephone company repairs the cut or damaged line.

From the above discussion it becomes apparent that a need exists to provide a cost effective, efficient technique to provide a temporary repair or replacement for an out of service drop cable of a subscriber's telephone loop. One technician should be able to effectuate any such temporary repair or replacement of the drop cable. Also, there should be no costs incurred unless and until the temporary repair is necessary.

DISCLOSURE OF THE INVENTION

The present invention addresses the above stated needs by providing a method and apparatus for installing wireless transceivers, providing a cordless telephone link (wireless drop) between the telephone line terminal and the customer premises, to replace the drop cable to the customer premises.

More specifically, a technician disconnects the drop cable from a telephone line terminal (network terminal) of the customer's telephone line, i.e. at a point still connected to the telephone switching system serving the particular customer's line. In place of the drop cable, the technician connects a first wireless transceiver to the line through the telephone line terminal. The drop cable also is disconnected from a network interface device that is connected to customer premises telephone wiring. The technician then connects a second wireless transceiver to the customer premises telephone wiring, e.g. through the network interface device.

The second transceiver presents a standard telephone line appearance to the customer premises telephone wiring. Standard telephone station equipment, connected to the customer premises wiring in the normal manner, can make and receive telephone calls, as if still connected to a wire-line type telephone loop circuit. Also, the installation requires little or no specialized equipment, and typically, one technician can instal the wireless drop system of the present invention.

The first transceiver used in the wireless drop system includes a first connector for providing the connection through the network terminal to the customer's telephone line. The first transceiver also includes a telephone circuit coupled to the first connector. This telephone circuit provides an electrical interface to the customer's telephone line of the public switched telephone circuit. The first transceiver further comprises a first radio transmitter/receiver, coupled to the telephone circuit. The first radio transmitter/receiver provides wireless communication of signals to and from the customer's telephone line through the telephone circuit.

The second transceiver used in the wireless drop system is adapted for location at the customer's premises. The second transceiver includes a second connector providing a connection to the customer premises telephone wiring. A telephone line interface in the second transceiver is coupled to the second connector. The telephone line interface emulates a telephone line appearance to the customer premises telephone wiring. The second transceiver also includes a second radio transmitter/receiver, coupled to the telephone line interface. The second radio transmitter/receiver provides wireless communication of signals to and from the customer premises wiring and to and from the first radio transmitter/receiver circuitry.

The telephone line interface used in the second transceiver preferably provides two-wire to four-wire conversion and includes amplifiers, to provide appropriate signal level conversions between voice grade signals on the customer premises wiring and signals communicated by the wireless transmitter/receiver. The telephone line interface provides power to the customer premises wiring, to operate the wire-line telephone equipment connected to the customer premises wiring. The telephone line interface also performs various supervisory functions. In the preferred embodiment, the telephone line interface includes a ringing signal generator and an associated ring-trip detector, to signal the presence of incoming calls and detect a call responsive answer condition at one of the telephone stations. The telephone line interface also includes an off-hook detector, to detect the start of an outgoing call from a customer premises telephone station. Tone dialing signals pass through the telephone line interface and the wireless transceivers as normal audio frequency telephone signals.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
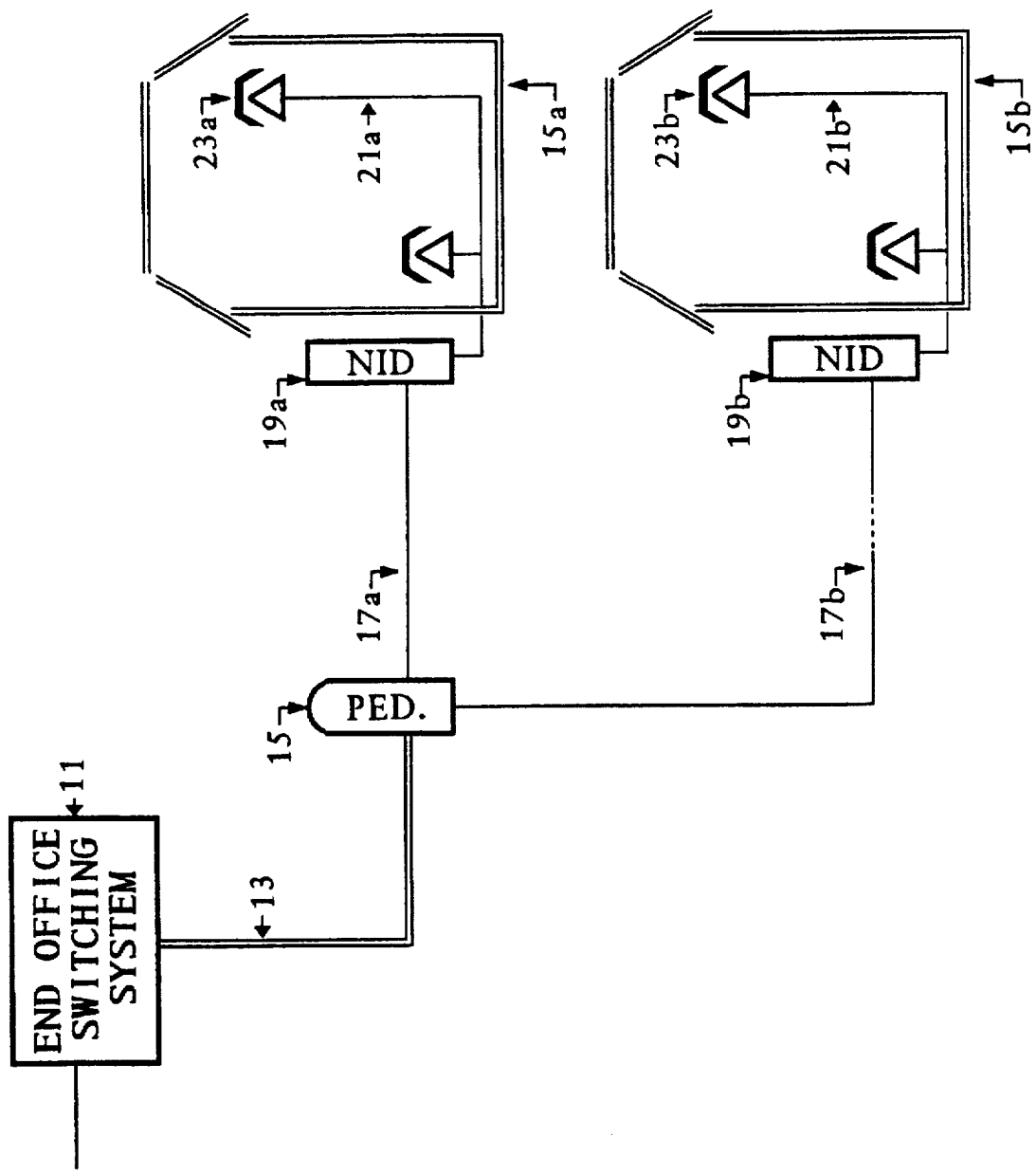
FIG. 1 is a simplified block diagram of a telephone network, including the drop cables to two subscriber premises, useful in explaining the present invention.

FIG. 1 provides a simplified representation of a telephone system. An end office switching system 11, of the local telephone company, connects through wire-line type telephone loop circuitry to subscriber premises. By way of an example, the end office switch 11 may be a 1AESS or 5ESS switching system sold by American Telephone and Telegraph. In the illustrated example, a number of lines run in a bundle 13 from the end office switch 11 to a telephone line terminal or network terminal. Although not shown, the loop circuitry 13 may include a variety of technologies, such as subscriber line carrier (SLC) systems, to combine traffic for a number of lines for longer runs between the end office switching system 11 and the terminal. However, generally the final drop to the customer premises comprises a twisted wire pair.

The terminal may be an aerial terminal, and the bundle of lines 13 may run above ground on telephone poles. In the illustrated example, the terminal is housed in a pedestal 15. Typically, a portion or all of the cable run 13 from the switch 11 to the pedestal 15 may be underground. The pedestal 15 provides a terminal connection from the bundle of lines 13 to a number of subscriber drop cables 17.

The lines in bundle 13 may comprise twisted wire pairs or other telephone communication channels, such as those provided by a SLC system as noted above. Each of the lines in bundle 13 terminates on a pair of terminals or wires in the pedestal 15. The drop cables 17 typically comprise four copper wires, two of which serve as an active twisted wire pair for telephone service. In the pedestal, the active twisted wire pair from each drop cable 17 connects to the pair of terminals or wires from a line from the bundle 13.

Each drop cable 17 runs from the pedestal 15 to a NID 19 at a subscriber premises 15. For purposes of explanation, FIG. 1 shows two subscriber premises 15a and 15b. A drop cable 17a connects to a line within the pedestal 15 and connects through a NID 19a to customer premises wiring 21a in premises 15a. Similarly, drop cable 17b connects to a line within the pedestal 15 and connects through a NID 19b to customer premises wiring 21b in premises 15b.

The subscriber premises wiring 21a, 21b connects to customer premises equipment, shown as telephone stations 23a, 23b respectively. On each premises, the NID 19a or 19b is the demarcation point between the public network elements and the subscriber premises wiring.

Each NID 19 essentially provides connectors for coupling the active twisted wire pair from a drop cable 17 to an active pair of wires in the customer premises wiring 21. In a typical modern installation, for example, the NID includes two RJ11 jacks, one marked for the drop cable and one marked for the customer premises wiring. An RJ11 plug attached to the end of a drop cable 17 connects into one jack, and an RJ11 plug attached to the customer premises wiring 21 connects into the other jack. Circuitry within the NID provides a connection between the two RJ11 jacks.

Figure 2:
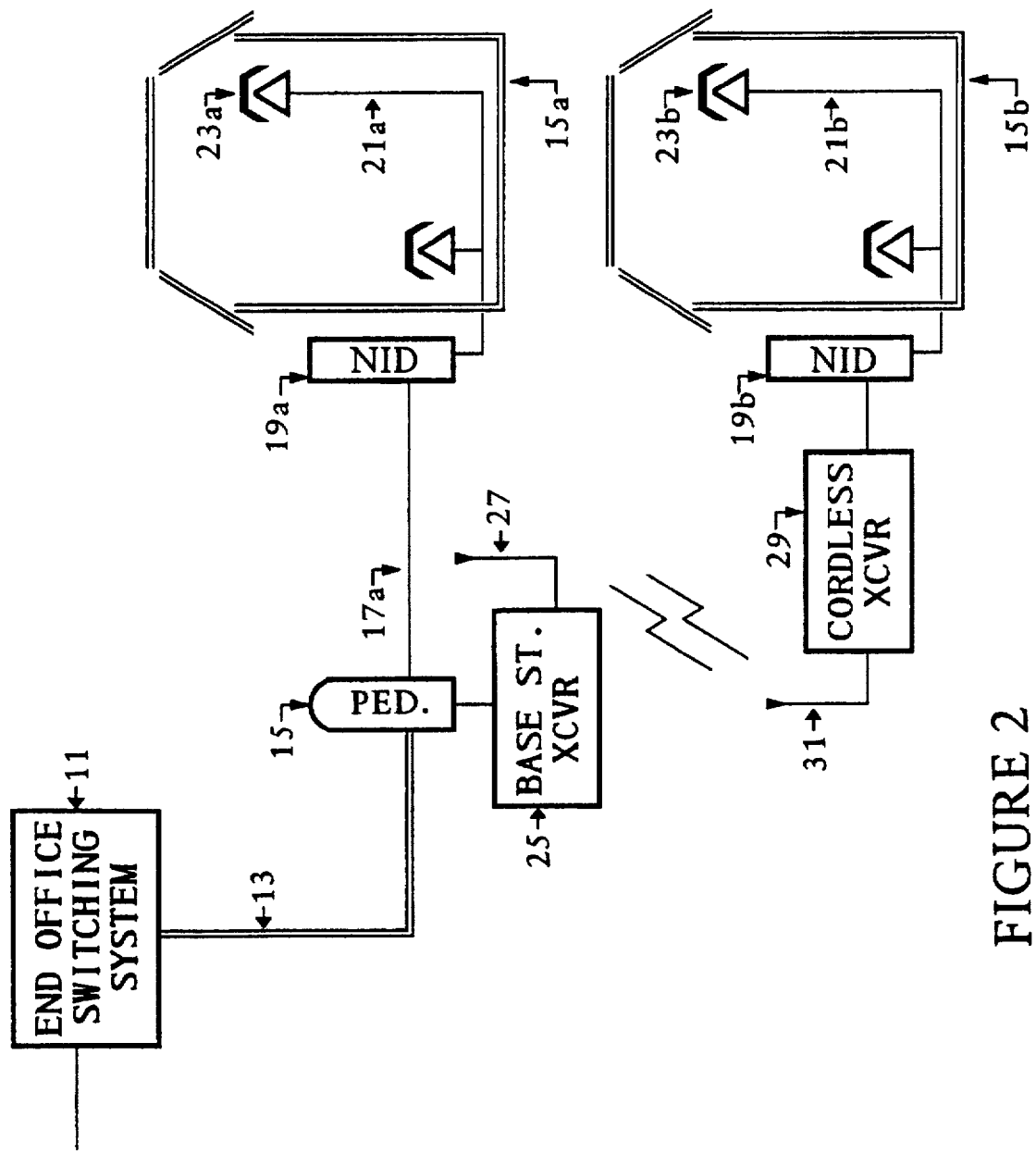
FIG. 2 is another block diagram of the telephone network of FIG. 1, but with wireless transceivers substituted for a cut drop cable, in accord with the present invention.

For purposes of discussion, now assume that someone inadvertently cuts the drop cable 17b, as shown by the dotted line portion thereof in FIG. 1. In the illustrated example using a pedestal 15, the drop cables 17 typically are buried. A full repair of the cut cable 17b therefore requires that the telephone company dispatch a repair crew with digging equipment, etc., to dig up the cable 17b, connect in a new cable and bury the new cable. As noted above, under many circumstances such a complex labor and equipment intensive repair may not be possible for some extended period of time. In accord with the present invention, the telephone company dispatches a single installation technician to effectuate a temporary repair, using wireless transceivers as shown in FIG. 2.

More specifically, the one technician opens the pedestal 15 and disconnects the damaged drop cable 17b. In its place, the technician connects a base station transceiver 25. The base station transceiver 25 sends and receives wireless telephone type signals, via an antenna 27. The technician also opens the NID 19b, and connects a cordless transceiver 29 in place of the drop cable. The cordless transceiver 29 sends and receives wireless telephone type signals, via an antenna 31.

In the currently preferred implementation, the transceivers 27, 29 operate in conformance to wireless communication regulations relating to cordless telephones. The transceivers 27, 29 transmit and receive voice grade telephone signals via frequency channels assigned for cordless telephone traffic (e.g. as opposed to channels assigned for cellular or PCS telephone services). The transceivers 27, 29 operate at relatively low power, for example providing a wireless drop length of 500 to 1000 feet.

The base station transceiver 25 is essentially similar to a base station unit of a common cordless telephone system. The cordless transceiver 29 includes transmission and reception circuitry similar to those found in the cordless handset of a common cordless telephone system. However, instead of using a built in microphone, speaker and keyboard, the cordless transceiver 29 includes circuitry to interface to telephone type customer premises wiring 21b. This permits a person at premises 15b to make and receive telephone calls using the standard telephone station equipment, such as one of the telephones 23b.

The base station transceiver 25 and the cordless transceiver 29 are complimentary units, matched to each other in the same manner that a cordless handset is matched to its complimentary cordless telephone base station. The base station transceiver 25 sends on a first selected frequency while the cordless transceiver 29 receives on that same selected frequency. The base station transceiver 25 receives on a second selected frequency while the cordless transceiver 29 sends on that selected frequency. The base station transceiver 25 and the cordless transceiver 29 also utilize matching identification codes in their respective control signaling messages for security purposes, again in the same manner as in cordless telephone systems.

Because the installation technician does not need to run a new cable, the installation is much simpler and can be completed by a single technician using little or no specialized equipment. The wireless link between the transceivers 29 and 25 provides full duplex two-way voice communication, incoming call processing and outgoing call processing which is substantially equivalent to the service normally provided via a standard, wire-line drop cable. The telephone company can reinstate the interrupted service as soon as a single technician can be dispatched. At some later time, when a full repair crew and the necessary equipment become available, the telephone company performs the actual replacement of the cut drop cable 17b with a new cable. When the replacement is otherwise complete, a technician disconnects and removes the base station transceiver 25. In its place, the technician connects the new drop cable 17b. The technician also disconnects and removes the cordless transceiver 29 and connects the new drop cable to the NID 19b.

Figure 3:
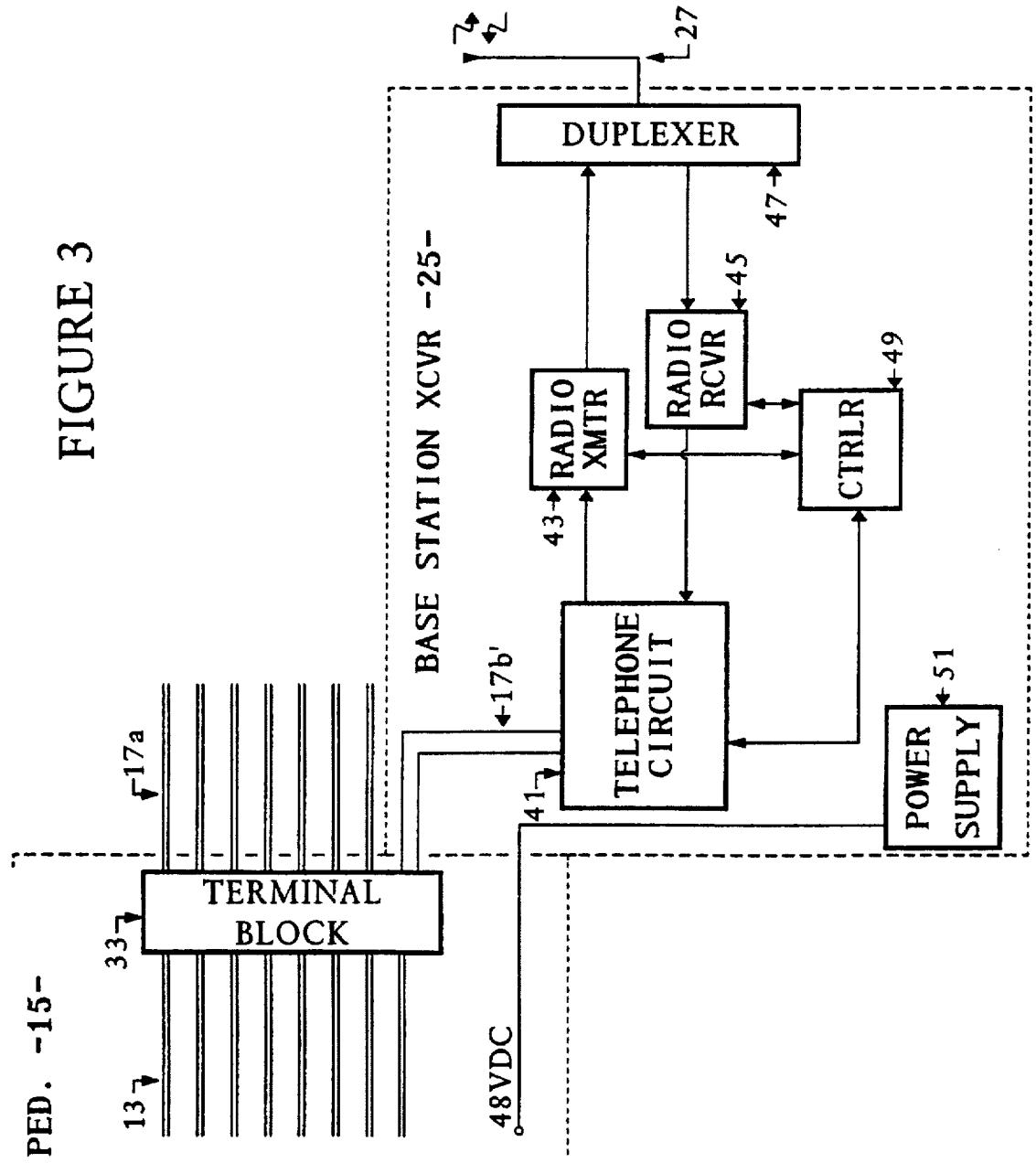
FIG. 3 is a simplified functional block diagram of the base station transceiver and showing connection thereof to the line terminal.

FIG. 3 provides a functional block illustration of the components of the base station transceiver 25 and shows the connection thereof to the terminal, in the illustrated example, to the circuitry of the pedestal 15. Although other circuitry may be included, the telephone line terminal (aerial or pedestal) will include a terminal block providing connections between lines from the bundle 13 to the individual drop cables. In the illustrated example, the pedestal 15 includes a terminal block 33 providing these line-to-drop connections.

Undamaged drop cables, such as cable 17a, remain connected to the terminal block in the normal manner. However, the cut or damaged drop cable is disconnected from the terminal block 33 and replaced with a two wire connection 17b' to the base station transceiver 25. The base station transceiver 25 includes a telephone circuit 41, a radio transmitter 43, a radio receiver 45 and a duplexer 47.

The telephone circuit 41 provides a standard plain old telephone service (POTS) type termination of the line 17b'. To the switching system 11, the telephone circuit 41 appears electrically the same as a standard telephone set connected to the line. For example, the telephone circuit 41 provides an open-circuit across the line when the line is not in use and closes the line circuit to initiate communications via the line, in response to appropriate instructions from a controller 49. The telephone circuit 41 also provides two-way signal format conversion and coupling, as necessary between audio signals sent and received via the transmitter 43 and the receiver 45. For example, the telephone circuit 41 provides a two-way coupling between the two-wire line circuit 17b' and four-wire connections to the radio circuitry (two wires to the transmitter 43 and two wires from the receiver 45). The telephone circuit also provides a number of line status signals to the controller 49, for example indicating the presence of a ringing signal on the line.

The radio transmitter 43 modulates audio frequency signals from the telephone line 17b' and telephone circuit 41 for wireless RF transmission. The radio transmitter 43 modulates the downstream audio signals into an available one of several channels, in response to an instruction from the controller. The controller 49 also generates op-code messages, for example specifying a ringing condition and containing the identifying code of the base station, and supplies such messages to the radio transmitter 43. The radio transmitter also modulates the op-code signals for wireless RF transmission. The transmitter 43 supplies the various modulated RF signals to the duplexer 47 which couples those signals to the antenna 27, for wireless broadcast.

In the upstream direction, the duplexer 47 couples RF signals received by the antenna 27, at least including channels assigned for upstream communication and/or upstream signaling, to the radio receiver 45. The radio receiver 45 demodulates information carried on a selected upstream channel, as identified in an instruction from the controller 49. If the demodulated information is an audio signal, the radio receiver 45 supplies the demodulated signal to the telephone circuit 41 for upstream transmission via the telephone line. If the demodulated information is an upstream op-code signal, for example containing the identification code of the cordless transceiver 29 and specifying a transition to an off-hook state by a customer premises station 23b, then the radio receiver 45 supplies the demodulated signal as a data message to the controller 49 for further processing.

For particularly high quality audio performance, the base station transceiver 25 and cordless transceiver 29 could utilize wireless digital communications. In such an embodiment, the radio transmitter 43 receives the audio signals from an analog to digital converter or itself includes such a converter. Similarly, the radio receiver 45 would include or connect to a digital to analog converter, for processing the demodulated audio signals.

The duplexer 47 provides a full duplex type two-way coupling of the transmitted and received signals between the antenna 27 and the transmitter 43 and receiver 45.

The controller 49 comprises a programmed microcomputer, typically implemented by a microprocessor with associated random access memory (RAM) and read only memory (ROM). The programming of the controller 49 controls the various operations of the base station transceiver 25, such as line seizure and release by the telephone circuit 41 and channel selection by the transmitter 43 and the receiver 45. The programming of the controller 49 also specifies the format of the various downstream op-code messages, the identification code of the base station unit and how to process upstream op-code messages and identification codes from the cordless transceiver 29.

The telephone circuit 41, the radio transmitter 43, the radio receiver 45, the duplexer 47, and the controller 49 are essentially the same as components used in cordless telephone type base station units. Examples of cordless telephone systems, including detailed disclosures of these components of base station transceivers, appear in U.S. Pat. No. 5,044,010 to Frenkiel et al. and U.S. Pat. Nos. 4,969,205 and 5,157,710 to Itoh.

A power supply 51 provides all necessary operating voltage and current to the various active elements of the base station transceiver 25. In most installations, the pedestal or aerial terminal receives 48 VDC power from the end office switching system 11. The power supply 51 for the base station transceiver 25 therefore connects to and draws its power from the 48 VDC present within the pedestal or aerial terminal.

Figure 4:
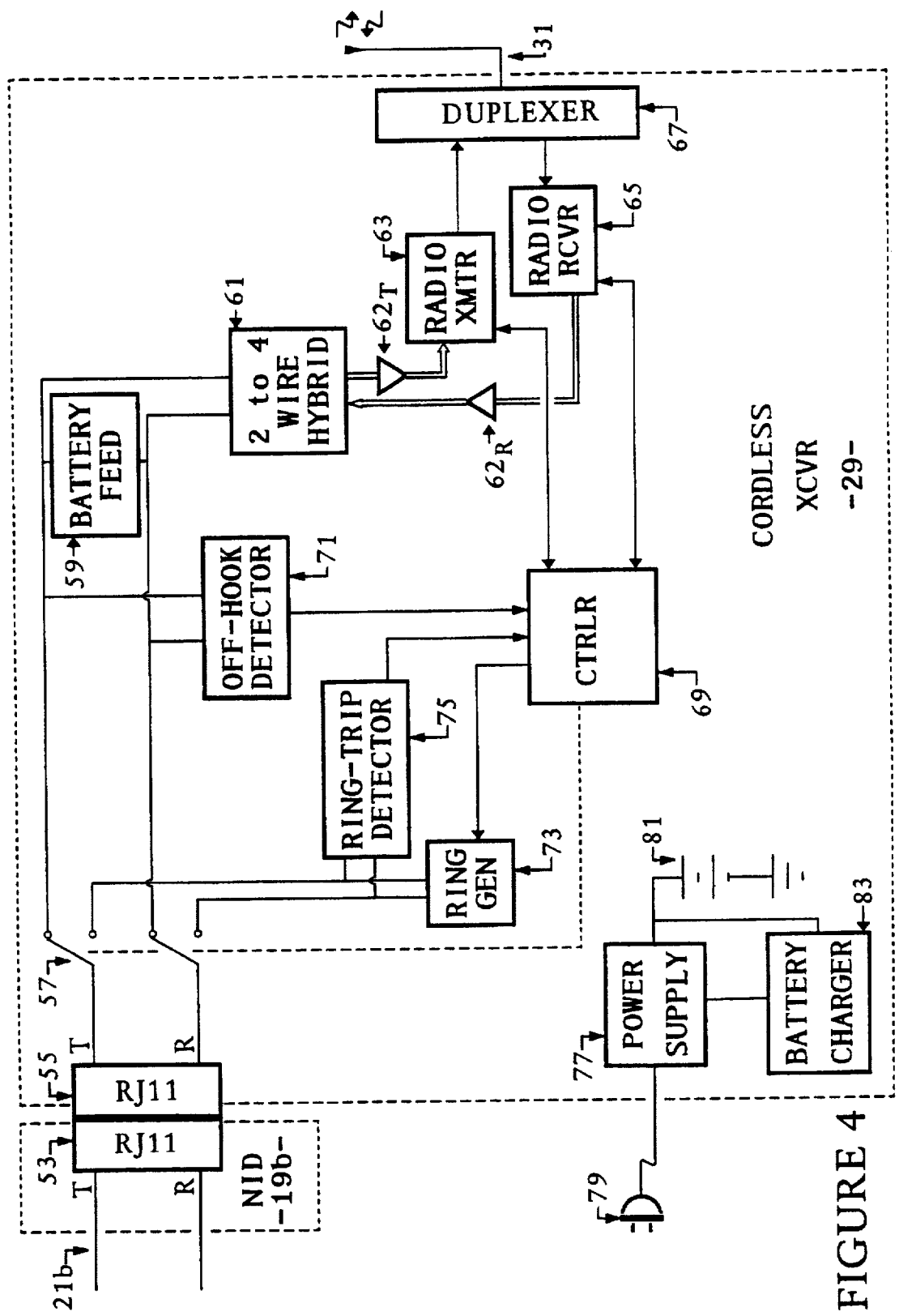
FIG. 4 is a simplified functional block diagram of a cordless telephone transceiver connected through the NID to the customer premises telephone wiring.

FIG. 4 provides a functional block illustration of the components of the cordless transceiver 29 and shows the connection thereof to the customer premises wiring 21b, in the illustrated example through the circuitry of the NID 19b.

Although other circuitry may be included in the NID, the NID will provide a coupling to the customer premises wiring. In the preferred embodiment, the NID 19b includes RJ11 jacks for connection to the customer premises wiring and the drop cable. FIG. 4 shows the NID 19b having an RJ11 jack 53 providing a tip (T) and ring (R) connection through circuitry and additional RJ11 connections (not shown) to the wiring 21b. The cordless transceiver 29 includes an RJ11 plug 55.

When the technician installs the cordless transceiver 29, the technician opens the NID 19b and removes the RJ11 plug of the damaged drop cable 17b from the RJ11 jack 53. The technician then inserts the RJ11 plug 55 of the cordless transceiver 29 into the RJ11 jack 53 in the NID 19b. Through this RJ11 connection, the cordless transceiver 29 connects to the customer premises wiring 21b in place of the inoperative drop cable 17b.

The cordless transceiver 29 presents a two-wire telephone appearance through the RJ11 plug 55 and the NID 19b to the customer premises wiring 21b. Through this two-wire port connection, the cordless transceiver 29 essentially emulates a POTS type analog telephone loop from an end office type telephone switching system. Circuitry of the transceiver 29, discussed in detail below, provides line voltage and current ('battery feed'), off-hook detection, ringing signal generation, etc., over the two-wire connection to the customer premises wiring 21b. To all customer premises telephone equipment 23b connected to the wiring 21b, the connection through the NID 19b to the cordless transceiver 29 electrically appears virtually the same as the connection through the NID 19b to the normal drop cable 17b.

In the cordless transceiver 29, the tip (T) and ring (R) leads from the RJ11 plug 55 connect through a relay 57 to a battery feed circuit 59 and a 2 wire to 4 wire hybrid 61. The battery feed circuit 59 provides the on-hook and off-hook DC voltages and current for operation of standard telephone equipment via a telephone line, such as the customer premises telephone wiring 21b. Normal telephone instruments provide two-way baseband voice grade communications via a two-wire DC loop circuit. A hybrid interfaces such a two-wire circuit for full duplex communication via a 4 wire circuit (2 transmit leads and 2 receive leads). The hybrid 61 provides a two-way coupling of baseband audio signals from the tip (T) and ring (R) leads to a 4 wire arrangement of transmit and receive ports.

The transmit and receive ports of the hybrid 61 connect to operational amplifiers $62_T$ and $62_R$. The operational amplifiers $62_T$ and $62_R$ provide signal level and impedance matching between the twisted wire pair circuitry coupled through the hybrid 61 and the transmitter and receiver circuitry of the transceiver 29.

The amplifier $62_T$ supplies upstream audio signals from the transmit port of the hybrid 61 to a radio transmitter 63. The radio transmitter 63 modulates the upstream audio frequency signals for wireless RF transmission. The radio transmitter 63 modulates the upstream audio signals into a channel corresponding to that currently used by the radio receiver 45 in the base station transceiver 25, in response to an instruction from a controller 69. The controller 69 also generates op-code messages, for example indicating an off-hook condition of a customer premises telephone device and containing the identifying code of the cordless transceiver, and supplies such messages to the radio transmitter 63. The radio transmitter 63 also modulates the op-code signals for wireless RF transmission. The transmitter 63 supplies the various modulated RF signals to a duplexer 67 which couples those signals to the antenna 31, for wireless broadcast.

The amplifier $62_R$ receives downstream audio signals from a radio receiver 65. In the downstream direction, the duplexer 67 couples RF signals received by the antenna 31, at least including channels assigned for downstream communication and/or downstream signaling, to the radio receiver 65. The radio receiver 65 demodulates information carried on a selected downstream channel, as identified in an instruction from the controller 69. The channel selected for reception by receiver 65 is the same as that currently used by the radio transmitter 43 in the base station transceiver 25. If the demodulated information is an audio signal, the radio receiver 65 supplies the demodulated signal through the receive amplifier $62_R$ to the receive port of the hybrid 61. The hybrid 61 in turn couples the received audio signal to the tip (T) and ring (R) leads through the RJ11 connection to the customer premises wiring 21b. If the demodulated information is a downstream op-code signal, for example indicating a ringing signal together with the identification code of the base station transceiver 25, then the radio receiver 65 supplies the demodulated signal as a data message to the controller 69 for further processing.

As noted above, the base station 25 and cordless transceiver 29 could utilize wireless digital communications. In such an embodiment, the radio transmitter 63 receives the audio signals from an analog to digital converter or itself includes such a converter. Similarly, the radio receiver 65 would include or connect to a digital to analog converter, for processing the demodulated audio signals.

The duplexer 67 provides a full duplex type two-way coupling of the transmitted and received signals between the antenna 31 and the transmitter 63 and receiver 65.

In the position shown, the relay 57 normally connects the tip (T) and ring (R) leads of the customer premises wiring 21b to the battery feed circuit 59. The cordless transceiver 29 includes an off-hook detector 71 coupled across the tip (T) and ring (R) leads through the contacts of relay 57. The off-hook detector 71 senses changes in voltage across the loop and/or current through the loop to detect transitions between on-hook and off-hook states of telephones 23b connected to the customer premises wiring 21b. The off-hook detector 71 provides signals indicating the on-hook and off-hook status to the controller 69.

The cordless transceiver 29 also includes a ringing signal generator 73 and a ring-trip detector 75. In response to an appropriate op-code from the cordless transceiver 25, the controller 69 activates the relay 57 to connect the tip (T) and ring (R) leads to the ringing signal generator 73 and the ring-trip detector 75. The controller 69 also activates the ringing signal generator 73. In this manner, the cordless transceiver applies a standard AC ringing signal to the customer premises wiring 21b, and the connected telephone equipment 23b rings. During ringing, if a one of the telephones 23b or other connected telephone equipment goes off-hook, indicating an answer condition, the ring-trip detector 75 detects this state transition and provides an indication thereof to the controller 69. In response, the controller 69 deactivates the ringing signal generator 73 and triggers the relay 57 to connect the tip (T) and ring (R) leads to the battery feed 59 and hybrid 61 for normal off-hook voice communication.

In response to either an off-hook detection by detector 71 or a ring-tip detection by detector 75, the controller 69 conducts appropriate op-code signaling with the base station transceiver 25 and activates the radio transmitter 63 and the radio receiver 65, to establish two-way cordless telephone communication.

The controller 69 comprises a programmed microcomputer, typically implemented by a microprocessor with associated random access memory (RAM) and read only memory (ROM). The programming of the controller 69 controls the various operations of the cordless transceiver 29, such as ringing by relay 57 and generator 73 and channel selection by the transmitter 63 and the receiver 65. The programming of the controller 69 also specifies the format of the various upstream op-code messages, the identification code of the cordless transceiver and how to process downstream op-code messages and identification codes from the base station transceiver 25.

The battery feed circuit 59, the hybrid 61, the amplifiers $62_T$ and $62_R$, the off-hook detector 71, the ringing signal generator 73 and the ring-trip detector 75 essentially form a POTS line interface for providing a POTS line type appearance to the telephone equipment 23b through the customer premises wiring 21b. The battery feed circuit 59, the hybrid 61, the off-hook detector 71, the ringing signal generator 73 and the ring-trip detector 75 are substantially similar to components used in a central office switching system to provide the necessary subscriber line interface functionality, for a loop-start type two-wire analog telephone line.

The radio transmitter 63, the radio receiver 65, the duplexer 47, and the controller 69 are essentially the same as components used in the handset of a cordless telephone system. Examples of cordless telephone systems, including detailed disclosures of these components of handset transceivers, appear in the above cited Frenkiel et al. and Itoh Patents.

The active elements of the cordless transceiver 29 normally receive power from a power supply circuit 77. In the illustrated embodiment, the power supply 55 draws power from the AC mains of the customer premises via an AC plug 79. The cordless transceiver 29 may include a battery 81 to provide power to the active elements. The battery 81 may serve as the primary power source, but preferably the battery 81 serves as a backup to the power supply 77, in the event of a failure of the AC power mains system. When the power mains system is active, a battery charger 83 provide power from supply 77 to maintain the charge on the backup battery 81.

To fully understand the invention, it may be helpful to consider in detail the execution of outgoing and incoming calls using the wireless drop technology of the present invention. Consider first the outgoing call.

In the position shown in FIG. 4, the relay 57 normally connects the tip (T) and ring (R) leads of the customer premises wiring 21b to the battery feed circuit 59. When all telephone stations 23b connected to the wiring 21b are on-hook, the wiring 21b presents an open circuit. The battery feed circuit applies a 48 volt DC voltage across the tip (T) and ring (R) leads, and relatively little current flows through the loop formed by the customer premises wiring and connected telephone equipment. When a telephone 23b connected to wiring 21b goes off-hook, a hookswitch in that telephone closes and completes the loop. Current flows through the loop formed by the cordless transceiver 29, the customer premises wiring 21b and the off-hook telephone 23b; and the voltage across the tip (T) and ring (R) leads drops.

The off-hook detector 71 detects the current flow and/or the voltage drop and supplies an off-hook detection signal to the controller 69. The controller 69 formulates an op-code type data message, indicating an off-hook and containing the identification code of the cordless transceiver 29, and supplies that data message to the radio transmitter 63. The radio transmitter 63 modulates the data message in the channel currently used for upstream communications and transmits the modulated signal through the duplexer 67 to the antenna 31. The antenna 31 radiates the modulated signal.

In the base station transceiver 25 (FIG. 3), the duplexer 47 couples RF signals received by the antenna 27 to the radio receiver 45. The radio receiver 45 demodulates information carried on the upstream channel, in this case the op-code message relating to the off-hook condition. The radio receiver 45 supplies the demodulated signal as a data message to the controller 49. The controller 49 examines the op-code message to determine if the identification code of the cordless transceiver 29 included in the message is correct. If so, then the controller 49 processes the op-code message.

In the present example, the op-code message received by the controller 49 indicates an off-hook. In response, the controller instructs the telephone circuit 41 to close the loop of the subscriber's telephone line through the connection 17b' to the appropriate line in terminal block 33. The end office switching system 11 detects this closed loop as an off-hook on the subscriber's line and supplies dial-tone in the normal manner.

The controller 49 in the base station transceiver 25 and the controller 69 in the cordless transceiver also activate their respective radio transmitters and receivers to enable two-way audio communication via selected RF channels and wireless communication between the antennae 27 and 31. The dial-tone supplied by the end office switching system 11 arrives at the base station transceiver 25 over the telephone line circuit as a normal audio signal. The telephone circuit 41 provides two-wire to four-wire conversion, and in this case, couples the audio signal (dial-tone) from the customer's line in bundle 13 to the radio transmitter 43.

The radio transmitter 43 modulates the downstream audio signal (dial-tone) into the selected downstream RF channel and supplies the modulated RF signal through the duplexer 47 to the antenna 27. The antenna 27 radiates the modulated signal to provide a wireless broadcast thereof.

At the customer premises, the antenna 31 (FIG. 4) supplies received RF signals to duplexer 67. The duplexer 67 couples the received RF signal to the radio receiver 65. The radio receiver 65 demodulates the audio information signal (dial-tone) and supplies the demodulated signal through the receive amplifier $62_R$ to the receive port of the hybrid 61. The hybrid 61 in turn couples the received audio signal (dial-tone) to the tip (T) and ring (R) leads through the RJ11 connection to the customer premises wiring 21b. In this manner, the off-hook telephone 23b receives a downstream audio signal representing central office dial-tone and reproduces that signal as an audible tone to the person using the telephone 23b.

At this time, the person using the telephone will normally dial a destination telephone number. For simplicity of discussion here it is assumed that the calling station has a keypad and dual-tone multi-frequency (DTMF) signal generator for dialing purposes. The user activates the keys of the keypad in the appropriate sequence to input the digits of the telephone number, and in response, the telephone transmits DTMF tones upstream over the wiring 21b, in the normal manner. DTMF tones are audio frequency signals and pass through the wireless drop as normal audio signals.

More specifically, the hybrid 61 supplies the audio DTMF signals through the transmit port and the transmit amplifier $62_T$ to the radio transmitter 63. The radio transmitter 63 modulates the upstream audio signal (DTMF tones) into the selected upstream RF channel and supplies the modulated RF signal through the duplexer 67 to the antenna 31. The antenna 31 radiates the modulated signal.

At the base station transceiver 29 (FIG. 3), the antenna 27 supplies received RF signals to duplexer 47. The duplexer 47 couples the received RF signal to the radio receiver 45. The radio receiver 45 demodulates the audio information signal (DTMF tones) and supplies the demodulated signal to the telephone circuit 41. The telephone circuit 41 in turn couples the received audio signal (DTMF tones) to the leads 17b' going through the terminal block 33 to the portion of the subscriber's line circuit running from the pedestal 15 to the end office switching system 11. In this manner, the end office switching system 11 receives DTMF signals representing the digits of the dialed destination telephone number. In response, the switching system 11 processes the call through the public switched telephone network in the normal manner.

Assume now, for example, that the call is answered at the destination station. The end office switching system 11 supplies audio signals (e.g. speech) from the destination station over the subscriber's line. At the pedestal 15, the terminal block connects that line through circuit 17b' to the telephone circuit 41 in the base station transceiver 25. The telephone circuit 41 couples the audio signal (e.g. downstream speech) from the line in bundle 13 to the radio transmitter 43.

The radio transmitter 43 modulates the downstream audio signal, now downstream speech, into the selected downstream RF channel and supplies the modulated RF signal through the duplexer 47 to the antenna 27. The antenna 27 radiates the modulated signal to provide a wireless broadcast thereof.

At the customer premises, the antenna 31 (FIG. 4) supplies received RF signals to duplexer 67. The duplexer 67 couples the received RF signal to the radio receiver 65. The radio receiver 65 demodulates the audio information signal, now downstream speech, and supplies the demodulated signal through the receive amplifier $62_R$ to the receive port of the hybrid 61. The hybrid 61 in turn couples the received audio signal, now downstream speech, to the tip (T) and ring (R) leads through the RJ11 connection to the customer premises wiring 21b. In this manner, the off-hook telephone 23b receives a downstream audio signal representing speech or other audio information from the called telephone station and presents that audio to the person using the telephone 23b.

In the normal manner, the off-hook telephone station 23b also applies upstream audio frequency signals to the customer premises wiring 21b, typically signals representing speech by the user of that station. In the cordless transceiver 29, the hybrid 61 supplies the audio signals (e.g. speech) through the transmit port and the transmit amplifier $62_T$ to the radio transmitter 63. The radio transmitter 63 modulates the upstream audio signal, now upstream speech, into the selected upstream RF channel and supplies the modulated RF signal through the duplexer 67 to the antenna 31. The antenna 31 radiates the modulated signal.

At the base station transceiver 29 (FIG. 3), the antenna 27 supplies received RF signals to duplexer 47. The duplexer 47 couples the received RF signal to the radio receiver 45. The radio receiver 45 demodulates the audio information signal, now upstream speech, and supplies the demodulated signal to the telephone circuit 41. The telephone circuit 41 in turn couples the received audio signal, now upstream speech, to the leads 17b' going through the terminal block 33 to the portion of the subscriber's line circuit running from the pedestal 15 to the end office switching system 11. In this manner, the end office switching system 11 receives signals representing speech from the user of the station 23b. The switching system 11 supplies those signals through the call connection through the public switched telephone network to the station of the called party, in the normal manner; and the called party's telephone station reproduces the speech as an audible output signal.

Now consider the processing of an incoming call directed to the customer premises 15b.

A distant party dials the telephone number of the premises 15b, and the telephone network processes that call through the end office switching system 11 (FIG. 2) in the normal manner. In response to the call, the end office 11 will apply an AC ringing signal to the subscriber's line. That ringing signal goes through the normal line circuit for this customer, to the pedestal 15. At the pedestal 15 (FIG. 3), the terminal block 33 connects the subscriber's line circuit from bundle 13 to the circuit 17b' in the base station transceiver 25.

The telephone circuit 41 detects the ringing signal on the circuit 17b' and provides an appropriate indication thereof to the base station controller 49. The controller 49 formulates an op-code type data message, indicating the ringing condition and containing the identification code of the base station transceiver 25, and supplies that data message to the radio transmitter 43. The radio transmitter 43 modulates the data message in the channel currently used for downstream communications and transmits the modulated signal through the duplexer 47 to the antenna 27. The antenna 27 radiates the modulated signal.

In the cordless transceiver 25 (FIG. 4), the duplexer 67 couples RF signals received by the antenna 31 to the radio receiver 65. The radio receiver 45 demodulates information carried on the downstream channel, in this case the op-code message relating to the ringing condition. The radio receiver 65 supplies the demodulated signal as a data message to the controller 69. The controller 69 examines the op-code message to determine if the identification code of the base station transceiver 25 included in the message is correct. If so, then the controller 69 processes the op-code message.

In the present example, the received op-code message indicates ringing. The controller 69 activates the relay 57 to connect the tip (T) and ring (R) leads to the ringing signal generator 73 and the ring-trip detector 75. The controller also activates the ringing signal generator 73 to apply an AC ringing signal to the customer premises wiring 21b. Through that wiring, the connected telephone equipment 23b receives a standard ringing signal and produces audible rings.

During ringing, if any one of the telephones 23b or other connected telephone equipment goes off-hook, indicating an answer condition, the ring-trip detector 75 detects this state transition and provides an indication thereof to the controller 69. In response, the controller 69 deactivates ringing signal generator 73 and triggers the relay 57 to connect the tip (T) and ring (R) leads to the battery feed circuit 59 and the hybrid 61.

At the same time, the controller 69 formulates an op-code type data message, indicating an off-hook and containing the identification code of the cordless transceiver 29, and supplies that data message to the radio transmitter 63. The radio transmitter 63 modulates the data message in the channel currently used for upstream communications and transmits the modulated signal through the duplexer 67 to the antenna 31. The antenna 31 radiates the modulated signal.

In the base station transceiver 25 (FIG. 3), the duplexer 47 couples RF signals received by the antenna 27 to the radio receiver 45. The radio receiver 45 demodulates information carried on the upstream channel, in this case the op-code message relating to the off-hook condition. The radio receiver 45 supplies the demodulated signal as a data message to the controller 49. The controller 49 examines the op-code message to determine if the identification code of the cordless transceiver 29 included in the message is correct. If so, then the controller 49 processes the op-code message.

In the present example, the op-code message received by the controller 49 indicates an off-hook. In response, the controller instructs the telephone circuit 41 to close the loop of the subscriber's telephone line through the connection 17b' to the appropriate line in terminal block 33. The end office switching system 11 detects this closed loop as an off-hook after ringing, i.e. as a ring-trip condition. The switching system disconnects the ringing signal from the line and completes the audio telephone connection between the caller's equipment and the customer's telephone line in the normal manner. The controllers 49, 69 activate their respective transmitters and receivers, and the called and calling parties conduct voice communication as in the above discussed outgoing call example.

As shown by the above discussion, a user at the customer premises 15b can initiate outgoing calls, receive incoming calls, conduct voice telephone conversations, etc. using the telephone equipment 23b in the normal manner. To the user, the wireless drop provided by the transceivers 25 and 29 appears entirely transparent. Assuming that the user has telephone equipment that the user can conveniently activate, e.g. a telephone having large keypad buttons for operation by a person who has difficulty using his or her fingers, that equipment operates in the normal manner.

The above described temporary wireless installation does not present the hazards of a temporary, above ground, replacement cable. As shown by the above discussion, the temporary wireless drop is relatively easy to install, requires no special installation equipment or technical skills, and can be installed by a single technician. Also, any telephone equipment, connected to customer premises wiring 21b, that can operate over the normal drop cable 17b can operate equally well via the wireless drop of the present invention.

The present invention is amenable to a number of modifications. For example, the above discussion concentrated on the installation of the cordless transceiver 29 at the NID 19b. Although presently preferred, other installations are possible. The cordless transceiver 29 actually can be installed anywhere on the customer premises 15b where it is convenient to make the necessary connection. For example, if there is no NID providing an RJ11 type connection, but the wiring 21b has a number of RJ11 connectors within the home, the technician can install the cordless transceiver 29 in any available one of the existing RJ11 jacks. In fact, in this type of repair procedure, it actually may be possible for customers to perform this part of the temporary installations themselves.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

We claim:

1. A method of replacing a telephone line drop cable comprising:

disconnecting the drop cable from a telephone line terminal providing a subscriber line connection to a telephone switching system;

connecting a first wireless transceiver to the subscriber line connection through the telephone line terminal, to enable communication via the subscriber line connection to the telephone switching system;

disconnecting the drop cable from customer premises telephone wiring;

connecting a second wireless transceiver to the customer premises telephone wiring to enable wireless communication with the first wireless transceiver; and presenting a standard telephone line appearance from the second wireless transceiver to the customer premises telephone wiring to enable equipment connected to the customer premises telephone wiring to communicate over the subscriber line connection to the telephone switching system via the wireless communication of the second transceiver with the first transceiver.

2. A method as in claim 1, wherein the telephone line terminal comprises a telephone service pedestal, and the drop cable comprises an underground drop cable.

3. A method as in claim 1, wherein the telephone line terminal comprises an aerial telephone terminal, and the drop cable comprises an aerial drop cable.

4. A method as in claim 1, wherein:

the subscriber line connection to a telephone switching system comprises a twisted wire pair; and the customer premises telephone wiring comprises a twisted wire pair.

5. A method as in claim 1, wherein the step of presenting a standard telephone line appearance comprises providing standard battery feed voltage and current to the customer premises wiring.

6. A method as in claim 1, wherein the step of presenting a standard telephone line appearance comprises selectively providing a ringing signal to the customer premises wiring in response to an incoming call.

7. A method as in claim 6, wherein the step of presenting a standard telephone line appearance further comprises detecting an off-hook condition of telephone station equipment connected to the customer premises wiring in response to an incoming call.

8. A method as in claim 1, wherein the step of presenting a standard telephone line appearance comprises detecting an off-hook condition of telephone station equipment connected to the customer premises wiring.

9. A method as in claim 1, wherein:

the customer premises wiring comprises a two-wire circuit; and the step of presenting a standard telephone line appearance comprises providing a two-way coupling of incoming and outgoing signals between the two-wire circuit and four wire transmit/receive circuitry of the second wireless transceiver.

10. A method as in claim 1, wherein:

the customer premises wiring connects to a network interface device;

the step of disconnecting the drop cable comprises disconnecting the drop cable from the network interface device; and the step of connecting a second wireless transceiver to the customer premises telephone wiring comprises connecting the second wireless transceiver to the network interface device.

11. A wireless telephone drop system, comprising a matched pair of wireless transceivers, wherein: a first transceiver of the matched pair comprises:

(a) a first connector for providing a connection to a terminal in a customer's telephone line remote from a serving central office of the public switched telephone network, (b) a telephone circuit coupled to the first connector for providing an electrical interface to the customer's telephone line of the public switched telephone network, and (c) first radio transmitter/receiver circuitry, coupled to the telephone circuit, for providing wireless communication of signals to and from the customer's telephone line through the telephone circuit, and for sending control codes to and receiving and validating control codes from a second transceiver of the pair; and the second transceiver of the pair is adapted for location at the customer's premises, said second transceiver of the pair comprising:

(1) a second connector for providing a connection to customer premises telephone wiring, (2) a telephone line interface coupled to the second connector for emulating a telephone line, appearance to the customer premises telephone wiring, and (3) second radio transmitter/receiver circuitry, coupled to the telephone line interface, for providing wireless communication of signals between the customer premises wiring and the first radio transmitter/receiver circuitry, and for receiving and validating control codes from and sending control codes only to the first transceiver.

12. A system as in claim 11, wherein:

the first radio transmitter/receiver circuitry comprises a cordless telephone radio transmitter and a cordless telephone radio receiver; and the second radio transmitter/receiver circuitry comprises a cordless telephone radio transmitter and a cordless telephone radio receiver.

13. A system as in claim 11, wherein the telephone line interface comprises an off-hook detector.

14. A system as in claim 11, wherein the telephone line interface comprises:

a battery feed circuit; and a two-wire to four-wire hybrid.

15. A system as in claim 14, wherein the telephone line interface comprises an off-hook detector.

16. A system as in claim 11, wherein the telephone line interface comprises:

a ringing signal generator; and a ring trip detector.

17. A system as in claim 11, wherein the telephone line interface comprises:

a battery feed circuit;

a two-wire to four-wire hybrid;

an off-hook detector;

a ringing signal generator; and a ring trip detector.

18. A system as in claim 11, wherein the second transceiver further comprises transmit and receive amplifiers coupled between the telephone line interface and the second radio transmitter/receiver circuitry.

19. A system as in claim 11, wherein the first transceiver further comprises a power supply for coupling to a line voltage source from a switching office of the public switched telephone network and providing power to active elements of the second transceiver.

20. In a public switched telephone network providing switched telephone service for a customer premises via a wire telephone line, a telephone call processing method, comprising:

routing a call intended for the customer premises through a public switched telephone network to the customer's wire telephone line;

providing two-way wireless communication between: (1) a first transceiver coupled to the customer's wire telephone line at a network terminal of the customer's wire telephone line remote from at central office switch serving the customer's wire telephone line, and (2) a second transceiver coupled to premises telephone line wiring at the customer premises; and completing the call to a wire-line telephone station connected to the customer premises telephone line wiring.

21. A method as in claim 20, wherein the two-way wireless communication comprises cordless telephone communication.

22. In a public switched telephone network providing switched telephone service for a customer premises via a wire telephone line, a telephone call processing method, comprising:

detecting an outgoing call from a wire-line telephone station through telephone wiring at the customer's premises;

providing two-way wireless communication between: (1) a transceiver coupled to telephone wiring at the customer's premises, and (2) a transceiver coupled to a network terminal of the customer's wire telephone line remote from a central office switch serving the customer's wire telephone line; and routing the outgoing call through the central office switch from the customer's wire telephone line to a called destination.

23. A method as in claim 22, wherein the two-way wireless communication comprises cordless telephone communication.

* * * * *